United States Patent
De Wilde et al.

(10) Patent No.: US 9,751,064 B2
(45) Date of Patent: Sep. 5, 2017

(54) VORTEX CHAMBER DEVICE, AND METHOD FOR TREATING POWDER PARTICLES OR A POWDER PARTICLES PRECURSOR

(71) Applicants: Friesland Brands B.V., Amersfoort (NL); Université Catholique De Louvain, Louvain-la-Neuve (BE)

(72) Inventors: Juray De Wilde, Nieuwpoort (BE); Philippe Edouard Jean Eliaers, Louvain-la-Neuve (BE); Albert Thijs Poortinga, Apeldoorn (NL)

(73) Assignees: FRIESLAND BRANDS B.V., Amersfoort (NL); UNIVERSITÉ CATHOLIQUE DE LOUVAIN, Louvain-la-Neuve (BE)

( * ) Notice: Subject to any disclaimer, the term of this patent is extended or adjusted under 35 U.S.C. 154(b) by 231 days.

(21) Appl. No.: 14/438,040

(22) PCT Filed: Oct. 25, 2013

(86) PCT No.: PCT/NL2013/050751
§ 371 (c)(1),
(2) Date: Apr. 23, 2015

(87) PCT Pub. No.: WO2014/065668
PCT Pub. Date: May 1, 2014

(65) Prior Publication Data
US 2015/0273421 A1    Oct. 1, 2015

(30) Foreign Application Priority Data
Oct. 26, 2012    (EP) .................................... 12190243

(51) Int. Cl.
*F26B 17/12*    (2006.01)
*B01J 2/16*    (2006.01)
(Continued)

(52) U.S. Cl.
CPC ................. *B01J 2/16* (2013.01); *B01J 2/003* (2013.01); *B01J 8/14* (2013.01); *B01J 8/1818* (2013.01);
(Continued)

(58) Field of Classification Search
CPC ... F26B 17/12; F26B 25/00; B01J 2/16; B01J 2/003; B01J 8/14; B01J 8/1818;
(Continued)

(56) References Cited

U.S. PATENT DOCUMENTS 3,768,172 A * 10/1973 Klein .................... F26B 17/107
                                                                        34/594
4,454,661 A *  6/1984 Klein .................... B01F 5/0057
                                                                        34/168
(Continued)

FOREIGN PATENT DOCUMENTS

BE    WO 2006064046 A2 *  6/2006 ................ B01J 8/14
BE    WO 2006064046 A3 *  8/2006 ................ B01J 8/14
(Continued)

OTHER PUBLICATIONS

D. Geldart, "Types of Gas Fluidization," Powder Technology, vol. 7, pp. 285-595, Netherlands, 1972.
(Continued)

*Primary Examiner* — Stephen M Gravini
(74) *Attorney, Agent, or Firm* — Hoffmann & Baron, LLP (57) ABSTRACT

A vortex chamber device comprising:
  a reactor comprising at least one chamber having a substantially circular cross-section;
  a device for feeding at least one fluid that is gaseous or liquid into the chamber;
  a device for removing said one or more fluids from the chamber;
  a device for feeding powder particles or a powder particles precursor to said chamber;
(Continued)

wherein said fluid removing device comprises at least one discharge opening for removing said at least one fluid from the chamber.

The invention also provides a method for treating powder particles or a powder particles precursor.

15 Claims, 6 Drawing Sheets

(51) Int. Cl.
| | | |
|---|---|---|
| *B01J 8/18* | (2006.01) | |
| *B01J 8/36* | (2006.01) | |
| *B01J 8/38* | (2006.01) | |
| *B01J 8/14* | (2006.01) | |
| *B01J 2/00* | (2006.01) | |
| *B05C 19/02* | (2006.01) | |
| *B05D 1/12* | (2006.01) | |
| *B05D 1/24* | (2006.01) | |

(52) U.S. Cl.
CPC .............. *B01J 8/1827* (2013.01); *B01J 8/36* (2013.01); *B01J 8/386* (2013.01); *B05C 19/02* (2013.01); *B05D 1/12* (2013.01); *B05D 1/24* (2013.01); *B01J 2208/00902* (2013.01)

(58) Field of Classification Search
CPC ............ B01J 8/1827; B01J 8/386; B01J 2208/00902; B05C 19/02; B05D 1/12; B05D 1/24
USPC ............................................................ 34/167
See application file for complete search history.

(56) References Cited

U.S. PATENT DOCUMENTS

| | | | | |
|---|---|---|---|---|
| 4,548,138 A * | 10/1985 | Korenberg | ............... | B01J 8/26 110/244 |
| 4,646,637 A * | 3/1987 | Cloots | ................... | B01J 8/1827 110/115 |
| 5,596,817 A * | 1/1997 | Hansen | .................... | B01D 1/18 159/4.05 |
| 5,647,142 A * | 7/1997 | Andersen | .................. | F26B 3/08 34/182 |
| 5,709,035 A * | 1/1998 | Wilhelm | ............... | F26B 25/002 34/167 |
| 6,085,440 A * | 7/2000 | Getler | ................... | F26B 3/0923 34/135 |
| 6,197,369 B1 | 3/2001 | Watano et al. | | |
| 6,475,462 B1 * | 11/2002 | Dodson | .................. | B01J 8/0015 422/145 |
| 6,898,869 B2 * | 5/2005 | Huttlin | ....................... | B01J 2/16 34/169 |
| 7,140,122 B1 * | 11/2006 | Adams | .................... | F26B 5/041 159/2.1 |
| 7,908,765 B2 * | 3/2011 | Waldron | ................... | F26B 3/08 264/117 |
| 8,677,647 B2 * | 3/2014 | Weisselberg | .......... | F26B 17/003 110/218 |
| 2009/0022632 A1 | 1/2009 | de Broqueville | | |
| 2009/0098263 A1 * | 4/2009 | de Broqueville | ...... | B01J 8/0025 426/465 |
| 2015/0273421 A1 * | 10/2015 | De Wilde | .................. | B01J 8/14 427/213 |

FOREIGN PATENT DOCUMENTS

| | | | | | |
|---|---|---|---|---|---|
| BE | KR 20070087101 A | * | 8/2007 | ................ | B01J 8/14 |
| BE | WO 2008107404 A1 | * | 9/2008 | ................ | B01J 8/14 |
| BE | WO 2014065668 A1 | * | 5/2014 | ................ | B01J 8/14 |
| WO | 2008107404 A1 | | 9/2008 | | |

OTHER PUBLICATIONS

Teunou et al., "Batch and continuous fluid bed coating—review and state of the art," Journal of Food Engineering, vol. 53, pp. 325-340, 2002.

* cited by examiner

VORTEX CHAMBER DEVICE, AND METHOD FOR TREATING POWDER PARTICLES OR A POWDER PARTICLES PRECURSOR

This application is the U.S. National Phase of, and Applicants claim priority from, International Patent Application Number PCT/NL2013/050751 filed Oct. 25, 2013, which claims priority from EP 12190243.1 filed Oct. 26, 2012, each of which is incorporated herein by reference.

The present invention relates to a vortex chamber device. An example of such a device, particularly as a rotating fluidized bed device, is described in US2009/0022632. The known device comprises:

a reactor comprising at least one cylindrical or circular chamber;

a device for feeding at least one fluid that is gaseous or liquid, wherein said fluid feed device is placed around a cylindrical or circular wall of said cylindrical or circular chamber;

a device for removing said one or more fluids;

a device for feeding solid particles on one side of said cylindrical or circular chamber;

a device for removing said solid particles on an opposite side of said cylindrical or circular chamber;

wherein said fluid removing device comprises a central duct passing longitudinally through or penetrating into said cylindrical or circular chamber, the wall of said central duct comprising at least one discharge opening for centrally removing said at least one fluid from the cylindrical or circular chamber via said central duct; wherein said fluid feeding device comprises fluid injectors distributed around said cylindrical or circular wall for injecting said at least one fluid in a succession of layers along said cylindrical or circular wall and rotating around said central duct while entraining said solid particles in a rotational movement whereby a centrifugal force thrusts them toward said cylindrical or circular wall through said layers;

wherein said centrifugal force is on average at least equal to three times the force of gravity, said solid particles thereby forming a rotating fluidized bed which rotates around and at a certain distance from said central duct while sliding along said cylindrical or circular wall and while being at least partially supported by said layers of said at least one fluid which passes through said fluidized bed before being removed centrally via said discharge opening of said central duct; and wherein a centripetal force is offset by said centrifugal force exerted on said solid particles.

According to US'632, a use of the device may include a method for drying or extracting volatile components from said solid particles. US'632 also provides for the use of the device in a method for impregnating or coating said solid particles. In a particularly preferred embodiment, the use of a device may be a method of drying, extraction, impregnation or coating, wherein the solid particles are grains, powder or other fragments of agricultural origin.

US'632 shows various examples of the device, such as an Example 1 wherein a plurality of fluid injection slits (for example 17 slits) are used, having a thickness of 5 mm. In another example (us'632's Example 3), 29 injection slits of thickness 5 mm, are applied, for injecting active fluids. Examples of actual treatments of powders are not disclosed in the publication.

The production and processing of powders is an important technological field. A frequently used processing step is the coating of powders. Presently, the most important method of coating powders is conventional fluidized bed coating. In conventional fluidized bed coating gas is made to flow through a bed of powder particles. The bed expands and at some point becomes fluidized, meaning that it behaves as a single fluid (see e.g. Journal of Food Engineering 53 (2002) 325-340). By introducing a spray of coating fluid one can coat the particles.

Although often used, several drawbacks exist towards the use of conventional fluidized bed coating. First, a limitation exists to the type of particles that can be coated. Powders that are relatively fine and have a relatively low density (particles classified as group C particles according to the well-known Geldart classification, see e.g. Powder Technology, 7 (1973) 285-292) cannot be fluidized by the conventional methods. Furthermore, coating is a relatively slow process leading to a relatively low throughput. This also leads to generally high costs of at least 0.60 €/kg as estimated in Journal of Food Engineering 53 (2002) 325-340. As a result, coating is generally only used for products with a relatively high added value and/or a low production volume.

Still, it would be highly advantageous to apply coating to products with a high production volume, e.g. food powders. For food powders coating could be advantageous to decrease stickiness, enhance flowability and to increase the shelf-life e.g. by shielding so-called free fat. It is therefore an object of the invention to obtain a method of coating powder particles that is fast and applicable to a wider range of powders.

The most frequently used way of producing powders from solutions or dispersions is spray-drying (an overview of spray-drying technology can be found in the Spray-drying handbook by K. Masters). Spray-drying basically consists of bringing a mist of droplets to be converted into powder in contact with hot drying air. Spray-drying has several drawbacks. These are generally related to the small heat and mass transfer rate that exists during drying which is caused by the small velocity difference between the drying gas and the droplets to be dried. As a result, spray-dryers are generally very large which leads to high investment costs. The large size of spray-dryers also makes it difficult to control that all particles undergo the same process. Failure to do so leads to suboptimal powder properties. It also limits the operating window of the process such that the process is running suboptimal with respect to e.g. energy efficiency. Therewith, an object of the invention becomes to obtain a powder-drying method with higher heat and mass transfer rates.

Also, an object is to provide an efficient method for the conversion of liquid droplets into solid particles, i.e. granulation, through drying.

In view of the objects mentioned, the present invention provides an improved device. Particularly, a device according to the invention is characterised by the features of claim 1. It has been found that the resulting device can provide a very efficient, economical treatment of powder particles. Particularly, it has been found that the device according to the invention can be successful in fluidizing relatively large amounts of powder.

Particularly, the vortex chamber device may include:

a reactor comprising at least one chamber having a substantially circular cross-section;

a device for feeding at least one fluid that is gaseous or liquid into the chamber;

a device for removing said one or more fluids from the chamber;

a device for feeding powder particles or a powder particles precursor to said chamber;

wherein said fluid removing device comprises at least one discharge opening for removing said at least one fluid from the chamber;

wherein said fluid feeding device comprises fluid injectors distributed around said chamber wall for injecting said at least one fluid along said wall, for transferring momentum to said powder particles or the powder particles precursor to enable a rotational movement whereby a centrifugal force thrusts the particles or precursor toward said wall through said injected fluid;

said powder particles or the powder particles precursor thereby forming a rotating fluidized bed which rotates around and at a certain distance from said fluid discharge opening while sliding along said chamber wall and while being at least partially supported by said at least one fluid which passes through said fluidized bed before being removed via said discharge opening;

wherein said fluid feeding device comprises more than 11 primary fluid injectors, with each of the fluid injectors including a fluid injection slit having a slit width that is smaller than 1 mm.

Said fluid feeding device may comprise at least 30 fluid injectors. Good results have been achieved with a device comprising at least 50 fluid injectors, for example at least 70 fluid injectors.

In a further embodiment, each of the fluid injectors has a slit width that is smaller than 0.5 mm, for example a width in the range of about 0.1-0.2 mm.

In a further embodiment, the vortex chamber device may have a chamber that includes a first section that includes said primary fluid injectors, and a second section adjoining the first section, the second chamber section including a plurality of secondary fluid injectors for feeding a fluid into the chamber that differs from fluid that is injected by the primary fluid injectors, for example by composition, temperature, injection pressure and/or flow rate.

In a further embodiment, the device may include a partition for partly separating the first and second chamber sections from each other.

In a further aspect, the device can include a liquid injector, for example a sprayer, for feeding liquid into the chamber. Particularly, the injector can be configured to feed liquid droplets, e.g. a mist or spay of the liquid, into the chamber.

During operation, e.g., a centripetal force (or radial gas-solid drag force) may be offset by said centrifugal force exerted on said solid particles or precursor.

An aspect of the invention provides a method for treating powder particles or a powder particles precursor, for example utilizing a vortex chamber device according to the invention, the method including the steps of:

- injecting at least one fluid along a wall of a chamber having a substantially circular cross-section;
- removing said one or more fluids from the chamber via a fluid discharge opening;
- feeding powder particles or a powder particles precursor to said chamber, wherein the injected fluid transfers momentum to said powder particles or the powder particles precursor to enable a rotational movement whereby a centrifugal force thrusts the particles or the precursor toward said wall through said injected fluid, wherein the powder particles or the powder particles precursor form a rotating fluidized bed which rotates around and at a certain distance from said fluid discharge opening while sliding along said wall and while being at least partially supported by said at least one fluid which passes through said fluidized bed before being removed via said discharge opening;
- wherein said fluid is injected via more than 11 primary fluid injectors, each generating a fluid layer having a layer thickness at the respective fluid injector that is smaller than 1 mm, wherein preferably more than 30 primary fluid injectors 11 are used, preferably generating fluid layers having layer thicknesses at the respective fluid injector smaller than 0.5 mm.

For example, the method may include feeding wet particles to the chamber, and drying the particles in the chamber.

According to a further embodiment, the method included spraying a fluid containing the particles into the chamber, the spraying particularly including atomizing the particles containing fluid, the fluid particularly being a liquid.

More particularly, the method can include feeding a liquid powder particles precursor to the chamber, and substantially drying the precursor in the chamber for generating powder particles.

In an advantageous aspect, the method includes spraying a fluid powder particles precursor into the chamber, the spraying particularly including atomizing the fluid, the fluid particularly being a liquid.

Particularly, a said powder particles precursor may be a solution or a dispersion. The precursor may e.g. be a liquid. As will be appreciated by the skilled person, the precursor (e.g. solution or dispersion) may for example be dried to convert the precursor into powder (i.e. powder particles).

Optionally, the method includes feeding a coating substance to the chamber to coat the powder particles.

In a preferred embodiment, the powder particles may have a density (particularly a true density) that is lower than 2500 kg/m$^3$, e.g. lower than 1500 kg/m$^3$. The density may e.g. be measured by pycnometry, as will be appreciated by the skilled person.

Particularly, the powder particles may have a density that is lower than 1000 kg/m$^3$.

The powder particles have a size density (D50) that is smaller than 500 micron.

Said size density can be defined as the value where half of the powder particle population resides above that value, and half resides below that value. As is known to the skilled person, for particle size distributions the median is called the D50. D50 is the size (in microns) that splits the volume distribution with half above and half below this diameter. As will be clear to the skilled person, this particle size distribution may e.g. be measured by laser diffraction analysis.

In a further embodiment, at least 90% of the powder particles has a maximum dimension (e.g. width or diameter) that is smaller than 1 mm, particularly a maximum dimension smaller than 0.75 mm. Also, in a further embodiment, at least some of the powder particles, for example at least about 10%, may have a maximum dimension that is smaller than 100 microns, e.g. a maximum dimension that is smaller than 50 microns The powder particles may be solid particles.

Non-limiting embodiments of the powder may include: a food or foodstuff powder, a dairy product powder, milk powder, skimmed milk powder, a whey protein powder or a whey protein containing powder, lactose powder or lactose containing powder, non-dairy creamer powder, flavour powder, encapsulate powder, fish oil encapsulate powder, infant and toddler nutrition powder, vending appliances powder, or a different type of powder.

In a non-limiting embodiment, the particles are dairy powders, e.g. have a density lower than 1500 kg/m$^3$ and a volume averaged size smaller than 300 micron. An example is commercially available whole milk powder with a volume-averaged size (d50) of about 140 micron and a true density of about 1000 kg/m³.

Further advantageous embodiments of the invention are described in the dependent claims. These and other aspects of the invention will be apparent from and elucidated with reference to non-limiting embodiments described hereafter, shown in the drawings.

Equal or corresponding features are denoted by equal or corresponding reference signs.

Aspects of the invention concerns the formation of particles from a liquid (i.e. a powder precursor) or the coating of small particles in a Rotating Fluidized Bed in a Static Geometry (RFB-SG). An example of a RFB-SG system is described in US2009/002632 (de Broqueville), which is incorporated by reference in the present patent application in its entirety.

FIGS. 1-9 show embodiments of the present application show extra advantageous vortex chamber devices (having static geometries), that have found to be particularly suitable for and capable of providing a rotating fluidized bed including powder or powder precursor.

Figure 1:
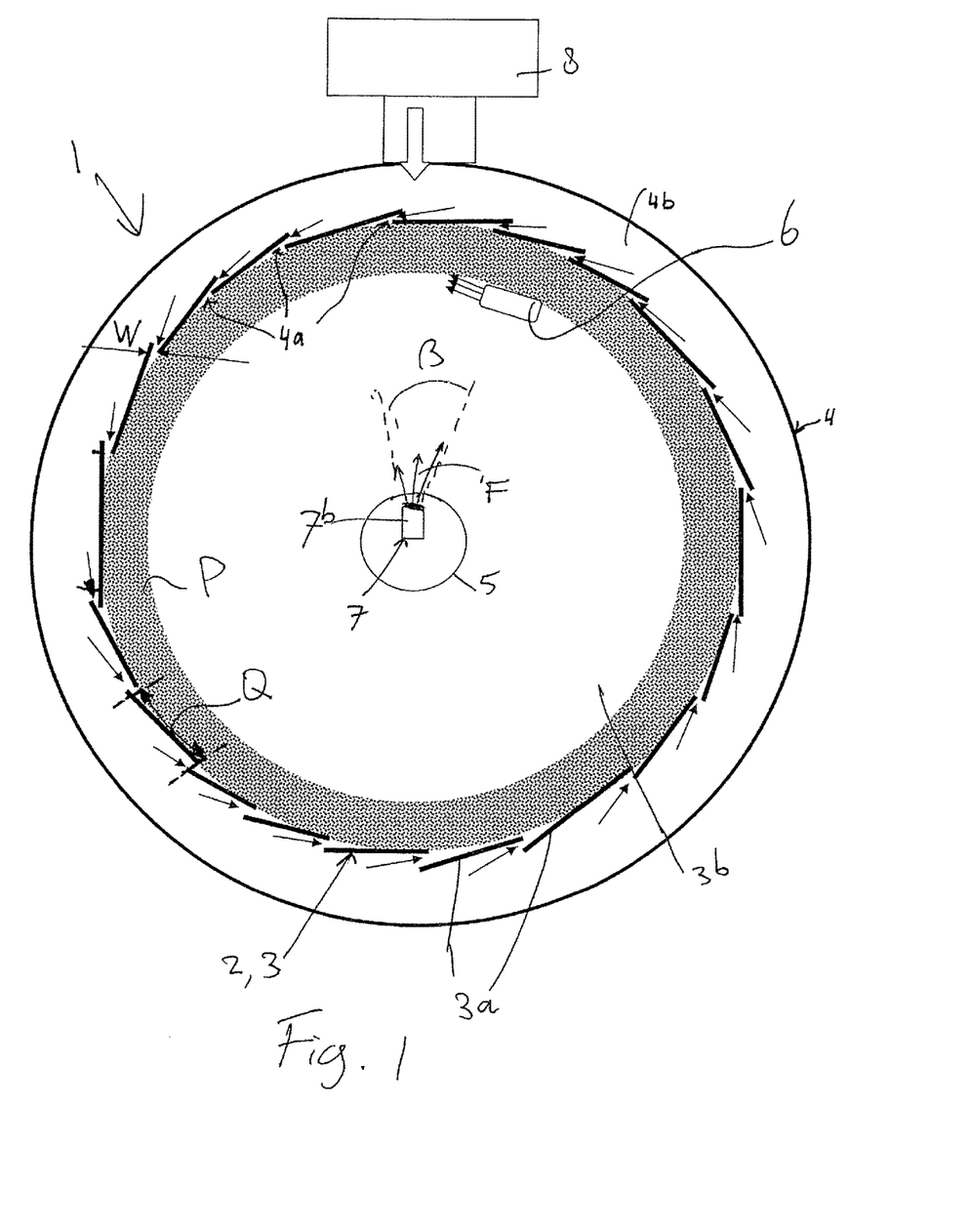
FIG. 1 schematically depicts a partially opened side view of a device according to a first embodiment of the invention.
Figure 2:
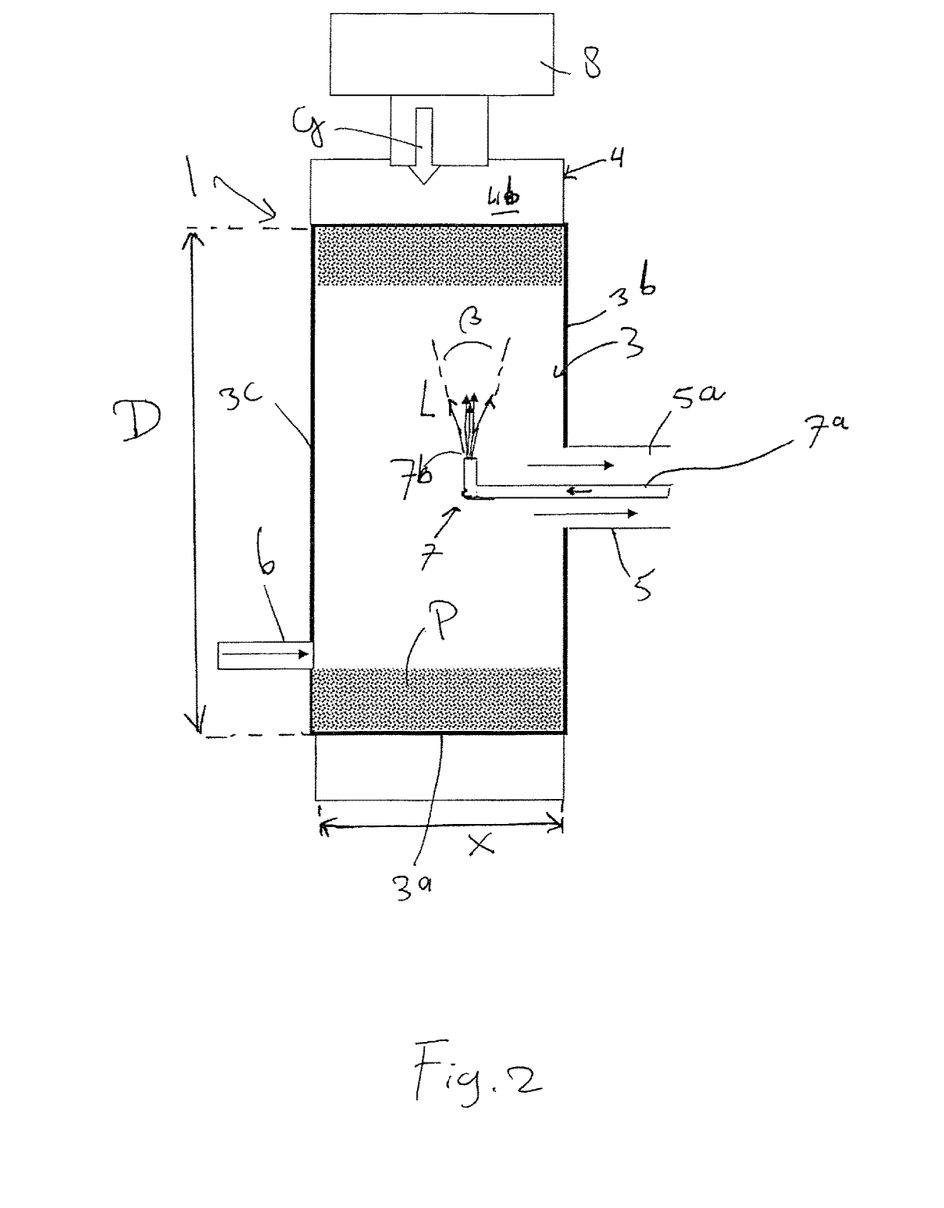
FIG. 2 schematically depicts a partially opened front view of the first embodiment.

Referring to FIGS. 1-2, in a first non limiting embodiment, there is provided a vortex chamber device 1 comprising a reactor 2 comprising at least one chamber 3 having a substantially circular cross-section. A diameter of the chamber 3 is indicated in FIG. 2 with double arrow D. This diameter may be relatively small, e.g. in the range of 20-50 cm, for example about 25 cm, or a different diameter. Optionally, a width X of the chamber may be in the range of about 3-20 cm, for example about 5 cm, of another width. The skilled person will appreciate that the invention is not limited to these dimensions.

The present chamber 3 is defined by two opposite side walls 3b, 3c, and an circumferential wall 3a having a substantially circular cross-section extending between the side walls 3b, 3c (the walls 3a, 3b, 3b defining a vortex chamber interior there-between)

The vortex device includes a device 4 for feeding at least one fluid into the chamber, the fluid being gaseous or liquid. Said fluid feed device 4 may be placed at least partly around the wall 3b of said chamber 3. In the example, the fluid feed device 4 includes a plurality of fluid injectors 4a, particularly slits 4a that extend through the intermediate/circumferential chamber wall 3a, and e.g. a fluid feeding chamber 4b extending around the vortex chamber 3, for feeding the fluid to the injectors 4a. A pump 8 may be provided for pumping the fluid G towards the plurality of fluid injectors 4a, particularly via the g. a fluid feeding chamber 4b, and more particularly for pressurizing the fluid feeding chamber 4b to a desired vortex generating operating pressure.

In a further embodiment, the injector slits 4a all extend substantially in parallel with one another. Also, the injector slits 4a may all extend substantially in parallel with a centre line of the vortex chamber 3. In a further embodiment, the injector slits 4a are formed such that they inject fluid in respective substantially tangential directions into the chamber 3, i.e. substantially along the inner side of the circumferential wall, particularly for generating a said vortex in the chamber.

Also, the vortex chamber device 1 includes a device 5 for removing said one or more fluids from the chamber 3, as well as at least one device 6, 7 for feeding powder particles P or a powder particles precursor F to said chamber 3. The example of FIG. 1-2 shows a first feeding device 6 and a second feeding device 7. Particularly, the first feeding device 6 may be a powder feeding device, feeding powder particles into the chamber. The second feeding device 7 may e.g. be configured for feeding a liquid L into the chamber. Particularly, the second feeding device 7 may be a liquid injector, for example a sprayer, for feeding the liquid L into the chamber. Such a second feeding device may e.g. be an atomizer, and may e.g. include at least one liquid atomizing nozzle (known as such to the skilled person). The liquid L may be sprayed into the chamber in a diverging (substantially conical) spray beam, as is shown in FIG. 1-2, to improve process efficiency, but that is not required. In a preferred embodiment, a said diverging substantially conical spray beam has a top angle β larger than 5 degrees, for example a top angle in the range of about 10 to 25 degrees (e.g. about 15 degrees), or a different top angle. The spray beam top angle may be smaller than 20 degrees, but that is not required.

In a preferred embodiment, the liquid injector device 7 includes a downstream liquid discharge opening (e.g. nozzle), to discharge the liquid L into the chamber, that is remote from the walls 3a, 3b, 3c of the chamber 3, as in the present examples. In a non limiting embodiment, the downstream liquid discharge opening may be located near a centre of the chamber 3. In yet a further embodiment, the downstream liquid discharge opening may be located opposite a said discharge opening 5a for removing said at least one fluid from the chamber (see FIG. 1).

In a preferred embodiment, the liquid injector device 7 is configured to direct the liquid in a substantially radial direction into the chamber, towards the circumferential wall 3a. For example, the liquid injector device 7 may have an upstream feed section 7a that extends near or along an axial centre line of the chamber into the chamber, wherein a downstream liquid injection nozzle part 7b extends substantially radially outwardly from the upstream feed section 7a, to inject liquid substantially radially outwardly into the chamber. In case of a substantially conical spray beam, a centre line of such a beam may be directed substantially radially outwardly into the chamber, from the nozzle part 7b. The skilled person will appreciated that different liquid injection directions are feasible as well.

In an alternative embodiment, the circumferential wall as such may include one or more liquid injectors, e.g. one or more spray nozzles, to inject the liquid L into the chamber. Also, in yet another embodiment, one or more liquid spray nozzles may be located in one or both of the chamber side walls 3b, 3c as such.

The vortex chamber device may lack a said liquid feeding device 7), in case only injection of powder particles is desired. Besides, in another embodiment, during operation, the said liquid feeding device 7 (if available) may be inoperative (i.e. no liquid is fed via that device 7 into the chamber) in the case that only the powder particles injector 6 is used to feed powder into the chamber.

Similarly, the device may lack a said powder feeding device 6, in case only injection of liquid L is desired. Examples of such devices (particularly powder precursor drying devices) are depicted in FIGS. 3-9. Besides, in another embodiment, during operation, the said powder feeding device 6 (if available, as in FIG. 1-2) may be inoperative (i.e. no powder is fed via that device 6 into the chamber) in the case that only the liquid injector 7 is used to feed liquid L into the chamber.

Also, as in the present drawing (FIG. 1-2), both the at least one liquid feeding device 7 and the at least one powder feeding device 6 may be implemented, and used together, e.g. for treating powder (injected via the powder feeding device 6) with liquid (injected via the liquid feeding device 7).

In the example, the fluid removing device 5 comprises at least one discharge opening 5a for removing said at least one fluid from the chamber. In the example, the discharge opening 5a is located centrally with respect to the chamber, i.e. centrally in the respective side wall 3b. A discharge duct 5 may be arranged and connected to the side wall 3b, for receiving the discharged fluid, for example for further possessing or treatment, regeneration, and for example for feeding discharged fluid back to an upstream section (e.g. the pump 8) of the system. In a further example, at least a part (e.g. an upstream feeding duct 7a) of a said liquid feeding device 7 may extend into the chamber via the discharge opening 5a, as in the embodiment of FIG. 1-2.

Particularly, the fluid feeding device 4 comprises fluid injectors 4a distributed around the respective chamber wall 3a (i.e. along the chamber wall 3a, viewed in circumferential direction) for injecting said at least one fluid (particularly in a succession of layers) along the wall 3a of the chamber. During operation, the injected fluid may transfer momentum to said powder particles P or the powder particles precursor, to enable a rotational movement whereby a centrifugal force thrusts the particles P or precursor toward said wall through said layers. Particularly, during operation, the powder particles P or the powder particles precursor may thereby form a rotating fluidized bed (see FIGS. 1-2) which rotates around and at a certain distance from said fluid discharge opening 5a while sliding along the circumferential wall and while being at least partially supported by said layers of said at least one fluid which passes through said fluidized bed before being removed via said discharge opening.

In a preferred embodiment, said fluid feeding device comprises more than 11 primary fluid injection slits 4a. Good results can be achieved in the case that the fluid feeding device comprises at least 30 fluid injector slits 4a. In a further preferred embodiment, said fluid feeding device comprises at least 50 fluid injector slits, for example at least 70 fluid injector slits, for example in the case that a diameter of the chamber 3 is about 24 cm.

In a further preferred embodiment, the fluid injector slits 4a are evenly/uniformly distributed, viewed along a circumferential direction of the chamber 3, e.g. at substantially equal distances between each two neighbouring slits for the entire slit sequence.

In a further embodiment, the fluid injector slits 4a are located relatively close to one another (i.e. providing a very high slit distribution), viewed along the circumferential direction of the chamber 3. Double arrow Q in FIG. 1 indicates the distance between two neighbouring slits 4a (the distance being measured in the circumferential direction of the chamber 3). In a preferred embodiment, this distance Q is smaller than 7 cm, for example smaller than 3 cm, more particular smaller than 2 cm. Good results can be obtained in case the fluid injector slits 4a are located at a distance Q—measured along the circumferential direction of the chamber 3—in the range of about 1 cm to 1.5 cm from each other, or a smaller range, for example a range of about 0.5 cm to about 1 cm. It is found that with such a relatively dense slit distribution, treatment of powder, or drying of powder precursor to produce powder, may be carried out with high efficiency and good results.

Moreover, according to a preferred embodiment, the fluid injection slits 4a are relatively narrow. Each of the fluid injectors can include a fluid injection slit 4a having a slit width W (indicated in FIG. 1) that is smaller than 1 mm. It is preferred that each of the fluid injectors has a slit width W that is smaller than 0.5 mm, for example a width W in the range of about 0.1-0.2 mm. A minimum slit width may be e.g. 0.1 mm, but that is not required. Also, the slits 4a preferably have a constant slit width, viewed along a longitudinal slit direction, but that is not required. It is found that with such a relatively narrow slits, and preferably in combination with a relatively dense slit distribution, treatment of powder, or e.g. drying of powder precursor to produce powder, may be carried out with good results.

In a further embodiment, there is provided device 9 for removing powder particles via a side of said chamber that is remote from said fluid injectors.

A preferred mode of operation of the device, shown in FIGS. 1-2, may include a method a method for treating powder particles or a powder particles precursor.

During operation, the following steps may be carried out:
injecting at least one fluid G along the chamber wall 3a;
removing said one or more fluids from the chamber via the fluid discharge opening 5, 5a;
feeding powder particles (e.g. via injector 6) or a powder particles precursor (e.g. via injector 7) to the chamber. The injected fluid G transfers momentum to said powder particles or the powder particles precursor to enable a rotational movement whereby a centrifugal force thrusts the particles or the precursor toward said wall 3a through said layers, wherein the powder particles or the powder particles precursor form a rotating fluidized bed which rotates around and at a certain distance from said fluid discharge opening 5 while sliding along said wall 3a and while being at least partially supported by said layers of said at least one fluid which passes through said fluidized bed before being removed via said discharge opening;

The fluid is injected via the more than 11 primary fluid injectors, each generating a fluid layer having a layer thickness at the respective fluid injector that is smaller than 1 mm. As follows from the above, preferably more than 30 primary fluid injectors 11 are used, preferably generating fluid layers having layer thicknesses at the respective fluid injector smaller than 0.5 mm.

One mode of operation may include feeding powder particles into the chamber, via the first injector 6, and treating the powder particles with a substance (e.g. spray L) that is fed into the chamber via the second injector 7, e.g. to coat the particles. To this aim, coating substance may be fed to the chamber, for coat the fluidized powder particles.

In another mode of operation, the spray injector 7 is applied to feeding a liquid powder particles precursor to the chamber 3. The precursor can be substantially dried in the chamber for generating powder particles there-from. For example, the drying may include spraying a fluid powder particles precursor L into the chamber, the spraying particularly including atomizing the fluid L, the fluid particularly being a liquid.

The present apparatus and method may be used for treating or generating the powder particles having e.g. a density that is lower than 2500 kg/m3, e.g. lower than 1500 kg/m$^3$. In an embodiment, the powder particles may have a density that is lower than 1000 kg/m$^3$.

Similarly, the present apparatus and method may be used for treating or generating powder particles powder particles having a size density (D50) that is smaller than 500 micron, as is mentioned before.

FIGS. 3-9 schematically show a number of preferred examples 101, 201, 301, 401, 501, 601, 701, of the apparatus, wherein the chamber 3 including a first section B1 that includes said primary fluid injectors for injecting the fluid G. The configuration of each first section B1 may be the same as or similar to the chamber shown in FIGS. 1-2, described above, with the fluid injection slits 4$a$, and e.g. a pump 8, fluid feeding chamber 4$b$. Also, a second section B2 is provided, adjoining the first section B1, the second chamber section B2 including a plurality of secondary fluid injectors for feeding a secondary fluid K into the chamber that differs from fluid G that is injected by the primary fluid injectors 4$a$. The second chamber section B2 may e.g. provide a "final drying" of a powder precursor that is to be dried to produce powder.

The plurality of secondary fluid injectors for feeding the secondary fluid K into the respective second chamber section B2 may e.g. have the same configuration as the slit injectors 4$a$ of the first section B1.

As follows from the drawings, in these examples, a side wall of the second chamber section B2 that is remote from the first chamber section B1 may include a discharge opening for removing powder ("solids") from the chamber, which powder may be formed in the device during operation, particularly powder resulting from the drying of powder precursor (sprayed into the first chamber section B1 via a respective injector 7).

The difference between the fluids may e.g. be selected from the parameters: fluid composition, fluid temperature, fluid injection pressure and/or fluid flow rate.

In a further embodiment, the fluid G that is fed into the first section B1 is has the same composition as the fluid K that is fed into the second chamber section B2.

In a further embodiment, the fluid G that is fed into the first section B1 has a higher temperature that a temperature of the fluid K that is fed into the second chamber section B2.

In a further embodiment, the fluid G that is fed into the first section B1 has a higher pressure, or a higher injection velocity, than a pressure or injection velocity, respectively of the fluid K that is fed into the second chamber section B2.

In a preferred embodiment, the fluid G that is fed into the first section B1 has a higher pressure, a higher injection velocity and a higher temperature, than a pressure, injection velocity and temperature, respectively, of the fluid K that is fed into the second chamber section B2. Thus, an efficient powder particle treatment or powder particles precursor drying can be achieved, wherein desired properties of the powder can be maintained (e.g. by preventing the particles to become overheated).

Particularly, the first chamber section B1 may be used as a primary treatment or drying section, wherein the second chamber section B2 may be used as a secondary treatment or drying section.

As follows from FIG. 3, an axial width of the second chamber section B2 may e.g. be larger than an axial width of the first chamber section B1. In this example, the axial width of the second chamber section B2 is at least twice the axial width of the first section B1.

Figure 3:
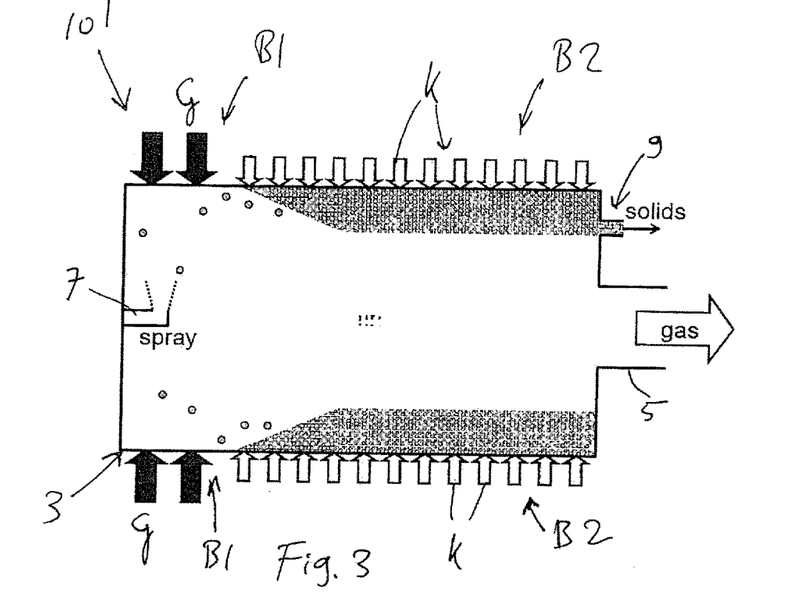
FIG. 3 schematically depicts a partially opened front view, similar to FIG. 2, of a second embodiment.

More particularly, FIG. 3 shows a first example, wherein there is no partition to separate the first and second chamber sections B1, B2 from each other.

Figure 4:
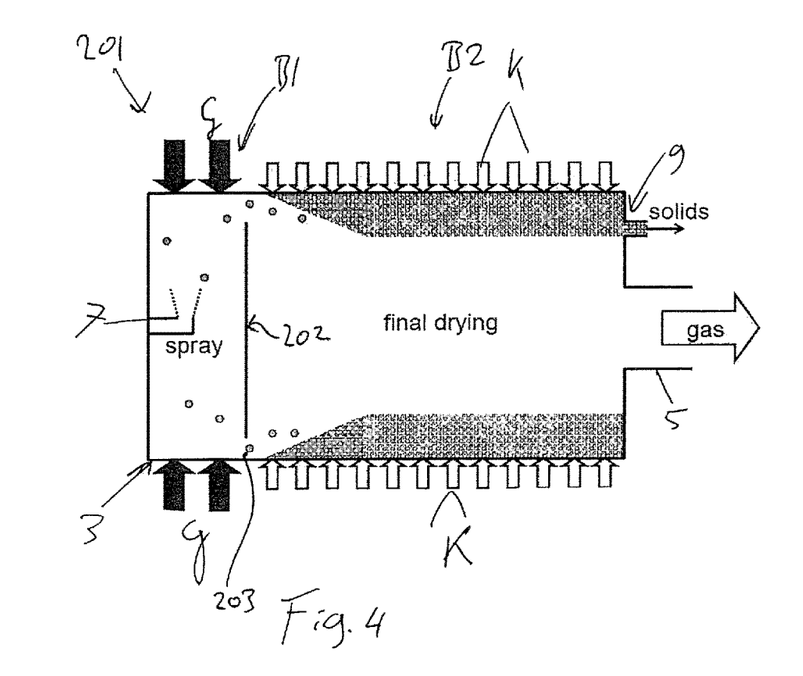
FIG. 4 schematically depicts a partially opened front view, similar to FIG. 2, of a third embodiment.

FIG. 4 shows a further embodiment 201, including a (central) partition 202 that partly separates the first and second chamber sections from each other. The partition 202 may e.g. be or include a relatively thin wall, e.g. a substantially circular wall, that substantially divides the chamber into the sections.

In the example, an outer edge of the partition 202 and an opposite side of the circumferential chamber wall enclose at least one gap 203, for example a substantially annular slit, for allowing passage of treated powder precursor and/or powder particles from the first to the second chamber section.

Figure 5:
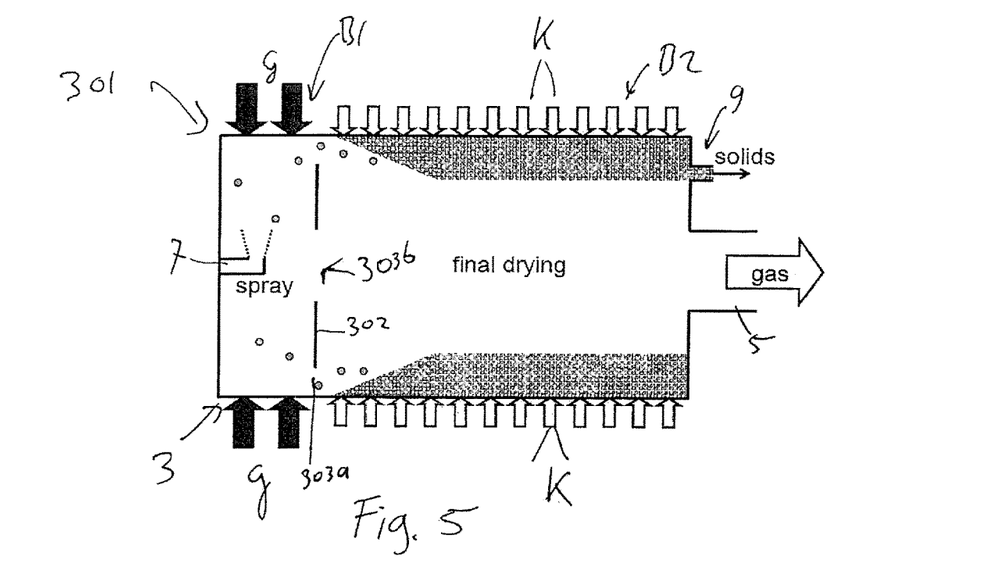
FIG. 5 schematically depicts a partially opened front view, similar to FIG. 2, of a fourth embodiment.

FIG. 5 shows a further embodiment 301, including a (central) partition 302 that partly separates the first and second chamber sections from each other. In the example, an outer edge of the partition 302 and an opposite side of the circumferential chamber wall enclose at least one gap 303$a$, for example a substantially annular slit, for allowing passage of treated powder precursor and/or powder particles from the first to the second chamber section. Besides, the partition 302 includes a central opening 303$b$, allowing efficient central passage of the primary fluid G towards the second chamber section B1 (to be discharged via the downstream discharge opening 5).

Figure 6:
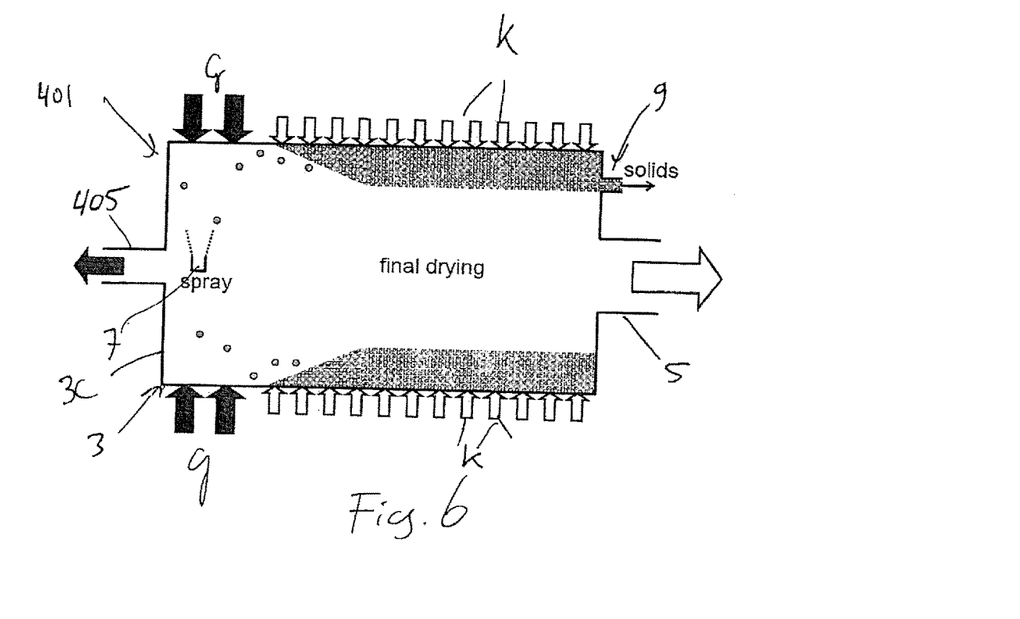
FIG. 6 schematically depicts a partially opened front view, similar to FIG. 2, of a fifth embodiment.

FIG. 6 shows an alternative embodiment 401, which differs from the example shown in FIG. 3 in that the first chamber section B1 is provided with a dedicated fluid outlet 405 (faced away from the second section B2 and located in a respective side wall 3$c$, in the example), for discharging a major part of the primary fluid G from that first chamber section B1. The fluid outlet 5 of the second chamber section B2 can be operative for discharging a major part of the secondary fluid K from the chamber (in an opposite direction than a discharge direction of the first fluid G, in this example).

Figure 7:
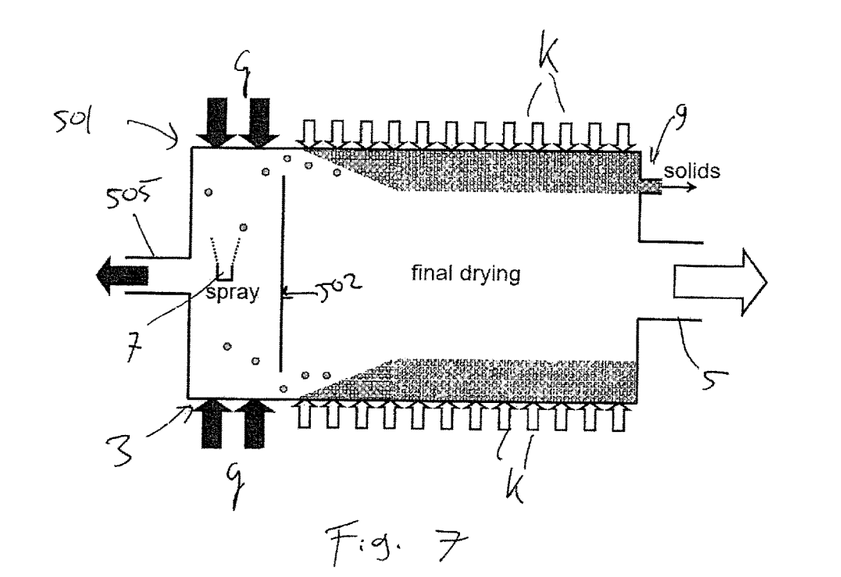
FIG. 7 schematically depicts a partially opened front view, similar to FIG. 2, of a sixth embodiment.

FIG. 7 shows a preferred example 501, that is a combination of the embodiments shown in FIGS. 6 and 4. As follows from FIG. 7, preferably, there can be provided a partition 502 for partly separating the first and second chamber sections from each other, wherein both chamber sections are provided with respective (preferably central, concentric) fluid discharge openings 5, 505 (located in-line with each other, in this example).

Figure 8:
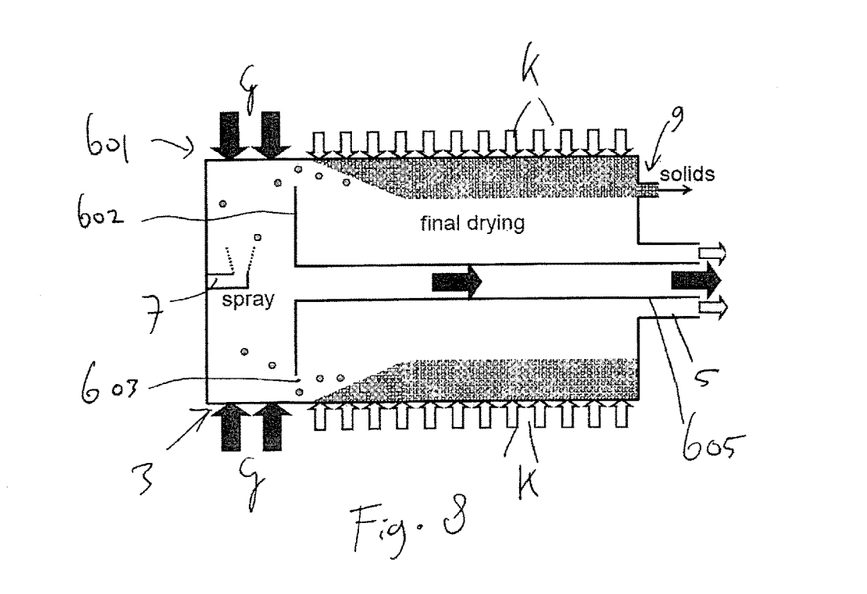
FIG. 8 schematically depicts a partially opened front view, similar to FIG. 2, of a seventh embodiment.

FIG. 8 depicts an alternative embodiment 601 which differs from the example of FIG. 7 in that a primary fluid outlet 605 is provided, extending centrally from the chamber dividing partition 602 via the fluid outlet 5 of the secondary chamber section B2 out of the device. In the embodiment of FIG. 8, an outer edge of the partition 602 and an opposite side of the circumferential chamber wall enclose at least one gap 603, for example a substantially annular slit, for allowing passage of treated powder precursor and/or powder particles from the first to the second chamber section.

Figure 9:
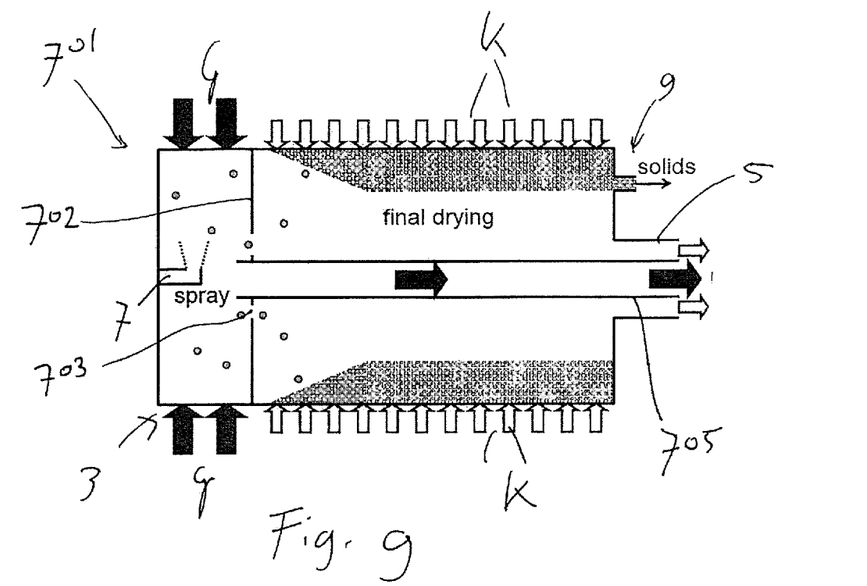
FIG. 9 schematically depicts a partially opened front view, similar to FIG. 2, of an eight embodiment.

FIG. 9 depicts an alternative embodiment 701 which differs from the example of FIG. 8 in that the partition 702 includes least one gap 703 near the central fluid outlet 705, for example a substantially annular slit, for allowing passage of treated powder precursor and/or powder particles from the first to the second chamber section. In this case. e.g., the partition 702 may adjoin the circumferential chamber wall in a fluid tight manner (i.e. without enclosing at least one gap with the wall).

Referring to FIGS. 1-9, typical for the RFB-SG configuration is that particles or droplets may be brought in a circular motion by the action of a fluid flow, particularly a gas flow (see FIG. 1), of the fluid G. The circular motion of the droplets/particles can lead to a centrifugal force working on them. The RFB-SG geometry may be particularly such that the centrifugal force is opposed by the drag force exerted by the gas on the particles/droplets. This allows the droplets/particles to persist in their circular motion. In a further embodiment, the drag force is equal to the centrifugal force, so that a significant (relatively high) velocity difference exists between the gas and the particles. This can lead to a significantly higher heat and mass transfer in a rotating fluidized bed than in a conventional bed, typically 10-100× higher. This is a main benefit of using a RFB-SG over a conventional fluidized bed.

It is observed that next to the here described Rotating Fluidized Beds in the Static Geometry also Rotating Fluidized Beds exist in which the equipment itself rotates (see e.g. U.S. Pat. No. 6,197,369). Such RFB's are likely more expensive and more difficult to scale-up and therefore are not part of the present invention.

In prior art methods, a wide range of particles have successfully been fluidized. However, until the present invention, particles with a density lower than e.g. 1500 kg/m$^3$ and a size smaller than 500 micron (particularly powder particles) have not yet been fluidized. It has been found that the fluidization of this kind of particles is not trivial. It can be derived that for successful fluidization the following conditions holds:

$$\frac{0.298 \cdot n}{(1-\varepsilon_s)} \sqrt{\frac{\rho_g}{\rho_s} \frac{s^2}{d_p D}} + \frac{0.853}{\eta} \sqrt{\frac{n}{\varepsilon_s} \frac{s d_p}{D^2}} \leq 1 \quad (1)$$

in which $\rho_s$ is the density of the particles, $\rho_g$ is the density of the gas, $\varepsilon_s$ is the solid volume fraction of the bed, $\eta$ is a factor describing the efficiency with which momentum is transferred in the tangential direction from the gas to the particles, D is the RFB diameter (see FIG. 2), $d_p$ is the particle diameter, n is the number of slots through which the gas is injected and s is the slot width. Eq. (1) shows that a lower particles density and a smaller particles size impose a stricter condition on the width of the slots. The efficiency of momentum transfer can be calculated from:

$$\eta = \frac{1 - \exp[-kd]}{kd} \text{ with } d = \frac{\pi d}{n} \text{ and } k = \frac{1.75\varepsilon_s}{d_p \varepsilon_g} \quad (2)$$

Many food powders, and in particular dairy powders, have a density lower than 1500 kg/m$^3$ and a volume averaged size smaller than 300 micron. An example is commercially available whole milk powder with a volume-averaged size (d50) of 140 micron and a true density of 1000 kg/m$^3$. It should be noted that these fine powders typically may have a rather broad size distribution. For whole milk powder for example 10% of the volume of the powder particles has a size smaller 50 micron. In a conventional method, the finer particles may be blown out of the fluidized bed. Embodiments of the present invention may solve or alleviate this problem.

Particularly, embodiments provide a RFB-SG design suitable to fluidize such powders. The fact that RFB-SG's can be advantageously used to granulate, i.e. convert liquid droplets in solid particles through drying, is also part of the invention.

Without wishing to be bound to theory, the following can be submitted. A force balance determines whether solids will be entrained by the gas into the chimney and as such the particle bed density and uniformity. To avoid entrainment of solids into the chimney (i.e. fluid outlet 5 and respective duct 5a), the centrifugal force should be larger than the radial gas-solid drag force. Both forces are generated by the gas flow, but the ratio of the centrifugal force and the radial gas-solid drag force can be modified by the RFB-SG design and in particular the gas inlet design. The particle bed rotational speed is determined by the amount of tangential momentum injected with the gas, $S_{inj}\rho_{inj}u_{inj}u_{inj}$, with $S_{inj}$ the total gas inlet surface area ($S_{inj}$=n·s·L). For a given gas mass flow rate fed, $S_{inj}\rho_{inj}u_{inj}$, the amount of tangential momentum injected can, hence, be varied by changing $u_{inj}$ via $S_{inj}$. The latter is determined by the number of gas inlet slots and their size. The centrifugal force on a particle can be theoretically calculated from:

$$F_{centr} = \left(\frac{\pi d_p^3}{6}\right) \cdot \left(\frac{2\rho_s \cdot v_t^2}{D}\right) \quad (1)$$

The tangential velocity of the particle bed, $v_t$, is related to the gas injection velocity:

$$\rho_g \cdot u_{t,inj}^2 \cdot \left(\frac{4n \cdot s}{\pi D^2}\right) = \langle \beta \cdot (u_t - v_t) \rangle \quad (2)$$

where variations in the gas phase density are neglected. A factor $\eta$ is introduced to account for the efficiency of tangential momentum transfer between the gas injected and the particle bed, the gas not being uniformly distributed:

$$\langle u_t - v_t \rangle = \eta \cdot (u_{t,inj} - v_t) \quad (2b)$$

Hence:

$$\rho_g \cdot u_{t,inj}^2 \cdot \left(\frac{4n \cdot s}{\pi D^2}\right) = \tilde{\beta} \cdot \eta \cdot (u_{t,inj} - v_t) \quad (2c)$$

The factor $\eta$ depends on the distance between the gas inlet slots and, hence, on their number (Trujillo and De Wilde, 2012b):

$$\eta = \frac{n}{\pi D \cdot (u_{t,inj} - v_t)} \int_0^{\pi D/n} (u_t - v_t) \cdot ds \quad (2d)$$

The evolution of the tangential slip velocity between two successive gas inlet slots can be calculated from:

$$\frac{d(u_t - v_t)}{ds} = -\frac{\beta}{\varepsilon_g \rho_g}(u_t - v_t) \quad (2e)$$

with inlet condition:

$$s=0 \Rightarrow (u_t - v_t) = (u_{t,inj} - v_t) \quad (2f)$$

Integration of (2e) results in:

$$(u_t - v_t) = (u_{t,inj} - v_t) \cdot \exp\left[-\frac{\beta}{\varepsilon_g \rho_g} s\right] \quad (2g)$$

Integration of (2d) then gives:

$$\eta = \frac{1 - \exp[-kd]}{kd} \quad (2h)$$

with:

$$d = \frac{\pi d}{n} \text{ and } k = \frac{1.75\varepsilon_s}{d_p \varepsilon_g} \quad (2i)$$

For turbulent and sufficiently dense gas-solid flows, the drag coefficient can be calculated from (Ergun, 1952):

$$\beta = 1.75 \frac{\varepsilon_s \cdot \rho_g}{d_p} \cdot |u - v| \quad (3)$$

Assuming the slip velocity is mainly in the tangential direction and linearizing:

$$\beta = 1.75 \frac{\varepsilon_s \cdot \rho_g}{d_p} \cdot \eta \cdot (u_{t,inj} - v_t) \quad (3b)$$

Hence:

$$v_t = \left(1 - \frac{1}{\eta}\sqrt{\frac{4n \cdot s \cdot d_p}{1.75\pi D^2 \cdot \varepsilon_s}}\right) \cdot u_{t,inj} \quad (4)$$

The radial gas-solid drag force can be calculated from:

$$F_{r,drag} = \beta \cdot u_r \cdot \left(\frac{\pi d_p^3}{6\varepsilon_s}\right) \quad (5)$$

where:

$$u_r = u_{t,inj} \frac{n \cdot s}{\varepsilon_g \pi D} \quad (5b)$$

At a certain distance from the gas inlet slots and assuming that there is no net radial transport of solids, the calculation of the drag coefficient β in (5) can be based on the assumption that |u–v| is roughly equal to $u_r$. From (1)-(5) a criterium for avoiding solids losses to the chimney and obtaining a rotating particle bed in a static geometry can be derived:

$$F_{centr} \geq F_{r,drag} \Rightarrow \frac{0.298 \cdot n}{(1-\varepsilon_s)}\sqrt{\frac{\rho_g}{\rho_s}\frac{s^2}{d_p D}} + \frac{0.853}{\eta}\sqrt{\frac{n}{\varepsilon_s}\frac{sd_p}{D^2}} \leq 1 \quad (6)$$

FIGS. 1-2 gives a possible spray configuration, i.e. with spraying maybe in the radial direction in the direction of the wall 3a, by injector 7. Alternatively, spraying may be in the angular direction in the direction of the rotation of the bed. The spraying may be done using one or more nozzles. When spraying in the angular direction the spray may e.g. be over 360° C. such as when using a spinning disc atomizer.

Further referring to FIGS. 3-9, in these examples a 2-stage drying may be assumed, but the same design can also be used to include more stages or can be used as a single stage dryer. Multiple stage drying is preferred to prevent overheating of the particles when the drying becomes limited by diffusion. In some of the designs the first and later stages are separated by a barrier (i.e. the partition 202, 302, 02, 602, 702), e.g. in order to regulate flow of particles from the first to the later stages. In some designs (see FIGS. 6-9) the outlet fluid G of the first stage and the outlet fluid K of later stages are separated, e.g. to facilitate heat recuperation. All designs in FIGS. 3-9 have an outlet 9 for the particles at one of the end walls (e.g. a wall plate).

As an alternative one could have the outlet for the particles tangential to the circular wall 3a of the chamber. In this way the particles leave the chamber 3 under the influence of the centrifugal force, i.e. the RFB-SG is used as a cyclone and drying chamber in one. Alternatively, a cyclone like design, e.g. with a converging bottom, may be applied.

In the following, various routes A-F are described to exploit the advantages of the novel RFB-SG design. The following provides some non-limiting examples.

A. RFB-SG Drying of Sticky Products

In an embodiment, droplet/particles that are to be dried can be constantly blown away from the chamber wall: thus, the RFB-SG can be used to dry sticky products.

B. RFB-SG for 1st Stage Drying at High Outlet Humidity

Unlike in conventional dryers, a drying gas (e.g. the primary fluid G and the optional secondary fluid G) with which the droplets/particles to be dried are in contact is constantly renewed in the RFB-SG. This makes it possible to perform the first part of the drying under conditions where the outlet gas (outlet fluid G) has a high humidity, which leads to more efficient use of the drying air. This drying step can be followed by the one or more after-drying stages (via e.g. eat least one section chamber section B2).

C. RFB-SG's Drying for Semi-Continuous Spray-Drying

The RFB-SG may have a very small footprint, allowing for the replacement of a conventional dryer by a multitude of smaller RFB-SG's. In this way production does not need to be stopped e.g. for cleaning leading to large potential cost savings.

D. RFB-SG for Low Temperature Drying of Sensitive Products

A drying of heat-sensitive products may require the use of low temperature air. This leads to slower drying, lower capacities and hence higher costs. The high heat and mass transfer in the RFB-SG makes the RFB-SG less sensitive to this effect, so that a higher temperature treatment fluid G (high temperature air) may be used.

E. RFB-SG for Low Temperature Drying with Efficient Heat Recovery

When drying is done at lower temperature energy recuperation using e.g. a zeolite can be done more efficient. In conventional spray-dryers this benefit will be off-set by strongly increasing capital costs but this will be much less so for the RFB-SG.

F. RFB-SG's Connected by Latent Heat Recovery Streams

A small footprint RFB-SG allows for the replacement of a conventional dryer by a multitude of smaller RFB-SG's. A problem with energy recuperation using e.g. a zeolite is where to use the steam coming of the zeolite during regeneration. When splitting up the dryer into several smaller dryers with the help of RFB-SG technology the steam produced during regeneration can be used to heat the inlet air of the next RFB-SG, etc.

The following provides some further examples of device setups and processes, that can be carried out with in the embodiments shown in the drawings.

Coating

Set-up

Fluidization chamber 3 having 72 fluid injection slits 4a slots, 0.2 mm wide each, the chamber having a diameter D of 24 cm diameter, a width X of 5 cm (e.g. with a volume of about 2.26 $10^{-3}$ m$^3$. The device may include a liquid injector, configured as a spray pressure nozzle 7b having a 0.5 mm spray orifice (e.g. Schlick 121), centrally mounted in the chamber 3 (counter-current gas-liquid operation). The primary fluid G may be air, set e.g. at a flow rate of 200-700 Nm$^3$/h, the air having an inlet temperature of 50-120° C. A vivinal powder may be fed to the chamber via a first injector 6. The powder may have a 70 µm mean diameter and a 260 kg/m$^3$ density (Geldart-C type powder). A powder flow rate may be 2-20 g/s. For coating the powder, e.g., an aqueous maltodextrine solution 50-50 wt % may be sprayed into the chamber, via the second injector 6, e.g. at a droplets size of 60-70 µm. Solution inlet temperature may be e.g. 50-90° C.; solution flow rate may be 0.5-4 g/s.

Particularly, fine particle coating has important applications in the pharmaceutical and food/feed industry. Two main routes can be used: wet- and dry coating. Fluidized bed technology is widely used for wet particle coating. The performance of conventional (i.e. gravitational) fluidized beds is, however, limited when coating cohesive Geldart-C type particles. Following from the above, a rotating fluidized bed in a static geometry (RFB-SG) can be used to great advantage for coating fine particles, e.g. with an aqueous polymer solution.

Results

A device as depicted in FIGS. 1-2 has been used in an experiment, with a 24 cm diameter, 5 cm length chamber, equipped with 72, 0.2 mm gas inlet slots 4a. The particles to be coated were fed via the front side of the chamber 3 (injector 6), whereas the liquid solution was injected using a 15° spray mounted centrally in the chamber (injector 7) and directing toward the outer wall 3a of the reactor (FIG. 1). The particles with a mean diameter of 70 micron and a density of 260 kg/m3 were fed at 2 g/s. The liquid solution was heated up to 90° C. prior to injection and the liquid droplets leaving the spray nozzle were on average 65 micron. The liquid flow rate and liquid-solid contact time were varied. The liquid solution was injected after establishing a stable rotating particle bed. Experiments were carried out at different air flow rates, 250 and 400 Nm3/h. The air fed was heated by means of an electric resistance to average feed temperatures between 55° C. and 70° C. Batch-wise and continuous particle coating was studied. It has been found that in this way, coated particles could be produced in a reproducible way.

Granulation

Set-up

Fluidization chamber 3 having 72 fluid injection slits 4a slots, 0.2 mm wide each, the chamber having a diameter D of 24 cm diameter, a width X of 5 cm (e.g. with a volume of about 2.26 $10^{-3}$ m$^3$. The device may include a 2-fluid nozzle, 0.5 mm orifice (Schlick mod970S4) (up to 3 nozzles). A setup can be used as is shown in FIG. 4, with a separation spray & initial drying zone B1 from subsequent drying chamber B2 by means of a disk. For granulation, air can be used as a treatment fluid, the air e.g. having a flow rate of: 200-700 Nm$^3$/h, at an inlet temperature of e.g. 150-250° C. For granulation, a solution can be used, e.g. an aqueous maltodextrine solution 50-50 wt %, to be sprayed into the device (droplets size: e.g. 10-50 µm), at a solution temperature of e.g. 50-90° C., and e.g. a solution flow rate of 0.5-3 g/s.

From the above it follows that aspects of the invention can provide an energy efficient drying, a low temperature drying (leading to less damage to products) and/or providing a relatively small or compact, relatively inexpensive, device to process or generate powders. It is expected that the present RFB designs can be 50 times smaller than conventional spray drying systems, providing the same drying capacity. Also, separating a powder from a treatment fluid stream (particularly but not limited to an air stream G) can be achieved in a straightforward manner. Moreover, the present device can provide a relatively rapid drying to generate powder, thereby significantly improving drying economics.

Although illustrative embodiments of the present invention have been described in greater detail with reference to the accompanying drawings, it will be understood that the invention is not limited to those embodiments. Various changes or modifications may be effected by one skilled in the art without departing from the scope or the spirit of the invention as defined in the claims.

It is to be understood that in the present application, the term "comprising" does not exclude other elements or steps.

Also, each of the terms "a" and "an" does not exclude a plurality.

For example, in an alternative configuration, the vortex chamber device may include 11 or less fluid injector slits 4a, wherein the slits 4a are still are located relatively close to one another (i.e. providing a very high slit distribution), viewed along the circumferential direction of the chamber 3. In such an embodiment, a distance Q between each two neighbouring slits may be e.g. smaller than 3 cm, more particular smaller than 2 cm, particularly a distance Q—measured along the circumferential direction of the chamber 3—in the range of about 1 cm to 1.5 cm from each other, or a smaller range, for example a range of about 0.5 cm to about 1 cm.

Besides, in embodiments, the reactor chamber may not be divided into different sections, or it may be divided into two sections B1, B2, or into more than two sections (e.g. by using more than one partition).

The invention claimed is:

1. A vortex chamber device comprising:
   a reactor comprising at least one chamber having a substantially circular cross-section;
   a device for feeding at least one fluid that is gaseous or liquid into the chamber;
   a device for removing said one or more fluids from the chamber;
   a device for feeding powder particles or a powder particles precursor to said chamber;
   wherein said fluid removing device comprises at least one discharge opening for removing said at least one fluid from the chamber; wherein said fluid feeding device comprises fluid injectors distributed around a chamber wall for injecting said at least one fluid along said wall, for transferring momentum to said powder particles or the powder particles precursor to enable a rotational movement whereby a centrifugal force thrusts the particles or precursor toward said wall through said injected fluid;
   said powder particles or the powder particles precursor thereby forming a rotating fluidized bed which rotates around and at a certain distance from said fluid discharge opening while sliding along said chamber wall and while being at least partially supported by said at least one fluid which passes through said fluidized bed before being removed via said discharge opening;

wherein said fluid feeding device comprises more than 11 primary fluid injectors, with each of the fluid injectors including a fluid injection slit having a slit width that is smaller than 1 mm.

2. The vortex chamber device according to claim 1, wherein said fluid feeding device comprises at least 30 fluid injectors.

3. The vortex chamber device according to claim 1, wherein said fluid feeding device comprises at least 50 to 70 fluid injectors.

4. The vortex chamber device according to claim 1, wherein each of the fluid injectors has a slit width in the range of about 0.1-0.2 mm.

5. The vortex chamber device according to claim 1, including a device for removing powder particles via a side of said chamber that is remote from said fluid injectors.

6. The vortex chamber device according to claim 1, the chamber including a first section that includes said primary fluid injectors, and a second section adjoining the first section, the second chamber section including a plurality of secondary fluid injectors for feeding a fluid into the chamber that differs from fluid that is injected by the primary fluid injectors.

7. The vortex chamber device of claim 6, including a partition for partly separating the first and second chamber sections from each other.

8. A device according to claim 1, including a sprayer, for feeding liquid into the chamber.

9. A method for treating powder particles or a powder particles precursor, utilizing a vortex chamber device according to claim 1, the method including the steps of:

injecting at least one fluid along a wall of a chamber having a substantially circular cross-section;

removing said one or more fluids from the chamber via a fluid discharge opening;

feeding powder particles or a powder particles precursor to said chamber, wherein the injected fluid transfers momentum to said powder particles or the powder particles precursor to enable a rotational movement whereby a centrifugal force thrusts the particles or the precursor toward said wall through said injected fluid, wherein the powder particles or the powder particles precursor form a rotating fluidized bed which rotates around and at a certain distance from said fluid discharge opening while sliding along said wall and while being at least partially supported by said at least one fluid which passes through said fluidized bed before being removed via said discharge opening;

wherein said fluid is injected via more than 11 primary fluid injectors, each generating a fluid layer having a layer thickness at the respective fluid injector that is smaller than 1 mm, wherein more than 30 primary fluid injectors are used, generating fluid layers having layer thicknesses at the respective fluid injector smaller than 0.5 mm.

10. A method according to claim 9, including feeding a liquid powder particles precursor to the chamber, and substantially drying the precursor in the chamber for generating powder particles.

11. A method according to claim 9, including spraying a fluid powder particles precursor into the chamber, the spraying particularly including atomizing the fluid, the fluid particularly being a liquid.

12. A method according to claim 9, including feeding a coating substance to the chamber to coat the powder particles.

13. A method according to claim 9, wherein the powder particles have a density that is lower than 2500 kg/m3.

14. A method according to claim 9, wherein the powder particles have a density that is lower than 1000 kg/m$^3$.

15. A method according to claim 9, wherein the powder particles have a size density (D50) that is smaller than 500 micron.

* * * * *